US008874701B2

(12) United States Patent
Guinard et al.

(10) Patent No.: US 8,874,701 B2
(45) Date of Patent: Oct. 28, 2014

(54) ON-DEMAND PROVISIONING OF SERVICES RUNNING ON EMBEDDED DEVICES

(75) Inventors: Dominique Guinard, Marly (CH);
Oliver Baecker, St. Gallen (CH);
Stamatis Karnouskos, Karlsruhe (DE);
Moritz Koehler, Zuerich (CH); Luciana Moreira Sa De Souza, Karlsruhe (DE);
Dominic Savio, Malschenberg (DE);
Patrik Spiess, Karlsruhe (DE); Mihai Vlad Trifa, Bex (CH)

(73) Assignee: SAP SE, Walldorf (DE)

( * ) Notice: Subject to any disclaimer, the term of this patent is extended or adjusted under 35 U.S.C. 154(b) by 1303 days.

(21) Appl. No.: 12/341,163

(22) Filed: Dec. 22, 2008

(65) Prior Publication Data

US 2010/0161778 A1    Jun. 24, 2010

(51) Int. Cl.
| | |
|---|---|
| G06F 15/177 | (2006.01) |
| G06F 11/30 | (2006.01) |
| H04L 12/24 | (2006.01) |
| G06F 9/50 | (2006.01) |
| G06F 9/445 | (2006.01) |

(52) U.S. Cl.
CPC .......... *G06F 9/5044* (2013.01); *G06F 11/3058* (2013.01); *H04L 41/0286* (2013.01); G05B 2219/31156 (2013.01); G05B 2219/25202 (2013.01); G05B 2219/31196 (2013.01); *G06F 8/61* (2013.01); *G06F 9/5027* (2013.01); G05B 2219/34038 (2013.01); *G06F 11/3093* (2013.01)
USPC ......................................... 709/220; 709/226

(58) Field of Classification Search
CPC ..... G06F 8/61; G06F 9/5027; G06F 11/3058; G06F 11/3093; H04L 41/0286

USPC .................................................. 709/220, 226
See application file for complete search history.

(56) References Cited

U.S. PATENT DOCUMENTS

| | | | |
|---|---|---|---|
| 6,604,140 B1 | 8/2003 | Beck et al. | |
| 7,831,412 B1 * | 11/2010 | Sobel et al. | .................. 702/186 |

(Continued)

FOREIGN PATENT DOCUMENTS

| | | |
|---|---|---|
| GB | 2 449 501 | 11/2008 |
| WO | WO 2007/113542 | 10/2007 |

OTHER PUBLICATIONS

Jeckle et al., Active UDDI—an Extension to UDDI for Dynamic and Fault-Tolerant Service Invocation, 2002, Revised Papers from the NODe 2002 Web and Database Workshops, ISBN:3-540-00745-8.*

(Continued)

*Primary Examiner* — Joseph E Avellino
*Assistant Examiner* — James Conaway
(74) *Attorney, Agent, or Firm* — Fish & Richardson P.C.

(57) ABSTRACT

A service type repository is populated with types of services exposed on a network that has a dynamic organization. The services are embedded on one or more devices included in the network and the services providing information about the one or more devices. A query is received that includes a request for a type of service, and the requested type of service is compared to the types of services in the service type repository to select a collection of matching service types that satisfy the request. Active instances of services that have a type included in the collection of matching service types are identified. The active instances are instances of services embedded on one or more devices included in the network. When no active instances are identified, active instances of services that have a type included in the collection of matching service types are discovered.

19 Claims, 9 Drawing Sheets

(56) References Cited

U.S. PATENT DOCUMENTS

| | | | |
|---|---|---|---|
| 2002/0120685 A1* | 8/2002 | Srivastava et al. | 709/203 |
| 2003/0105846 A1* | 6/2003 | Zhao et al. | 709/221 |
| 2003/0187841 A1* | 10/2003 | Zhang et al. | 707/4 |
| 2004/0107196 A1* | 6/2004 | Chen et al. | 707/4 |
| 2005/0080768 A1* | 4/2005 | Zhang et al. | 707/3 |
| 2005/0188086 A1* | 8/2005 | Mighdoll et al. | 709/225 |
| 2005/0198333 A1 | 9/2005 | Dinges et al. | |
| 2005/0283539 A1* | 12/2005 | Betts et al. | 709/245 |
| 2007/0078860 A1* | 4/2007 | Enenkiel | 707/10 |
| 2007/0118549 A1 | 5/2007 | Bornhoevd et al. | |
| 2007/0233881 A1 | 10/2007 | Nochta et al. | |
| 2010/0100525 A1* | 4/2010 | Huang | 707/609 |

OTHER PUBLICATIONS

Zongxia et al., Ad-UDDI: An Active and Distributed Service Registry, 2006, 6th VLDB Intl. Wsp. on Technologies for E-Services, vol. 3811 of Lect. Notes in Computer Science.*

'UPnP QoS Architecture: 1.0' [online]. UPnP Forum, 2005 [retrieved on Dec. 11, 2008]. Retrieved from the Internet: <URL: http://www.upnp.org/standardizeddcps/documents/UPnP_QoS_Architecture1.pdf>, 28 pages.

'Windows Vista Connectivity' [online] ActiveWin: Windows Vista, 2008 [retrieved on Dec. 11, 2008]. Retrieved from the Internet: <URL: http://www.activewin.com/winvista/Connectivity.shtml>, 4 pages.

Srinivasan et al., "Adding OWL-S to UDDI, Implementation and Throughput," *Proceedings of the First International Workshop on Semantic Web Services and Web Process Composition*, 2004, 12 pages.

Bilgin and Singh, "A DAML-Based Repository for QoS-Aware Semantic Web Service Selection," *Proceedings of the IEEE International Conference on Web Services*, 2004, 8 pages.

Zhou et al, "DAML-QoS Ontology for Web Services," *Proceedings of the IEEE International Conference on Web Services*, 2004, 8 pages.

Liu et al., "QoS computation and policing in dynamic web service selection," *Proceedings of the 13th International World Wide Web conference on Alternate track papers & posters*, New York, NY, 2004, pp. 66-73.

"Reputation = f(User Ranking, Compliance, *Verity*)," *Proceedings of the IEEE International Conference on Web Services*, 2004, 8 pages.

Balke and Wagner, "Towards personalized selection of web services," *12th International World Wide Web Conference, WWW*, 2003, 9 pages.

Batini et al., "The UM-MAIS methodology for multi-channel adaptive web information systems," *World Wide Web*, Springer Netherlands, 2007, 10(4):349-385.

Berger et al., "Web services on mobile devices—Implementation and experience," *Proceedings of the Fifth IEEE Workshop on Mobile Computing Systems and Applications*, 2003, 10 pages.

Ceri et al., "Model-driven engineering of active context-awareness," *World Wide Web*, 2007, 10(4):387-413.

Delamer and Lastra, "Loosely-coupled automation systems using device-level SOA," *5th IEEE International Conference on Industrial Informatics*, 2007, vol. 2: 743-748.

El-Sayed, "Semantic-based context-aware service discovery in pervasive-computing environments," *IEEE Workshop on Service Integration in Pervasive Environments (SIPE)*, 2006, 96 pages.

Lee and Helal, "Context attributes: An approach to enable context-awareness for service discovery," *Proceedings of the 2003 Symposium on Applications and the Internet*, 2003, 9 pages.

Ditze et al., "Quality of service and proactive content replication in UPnP based A/V environments," *23rd International Multi-Conference on Applied Informatics*, Innsbruck, Osterreich, 2005, 6 pages.

Martin et al., "Bringing Semantics to Web Services with OWL-S," *World Wide Web*, 2007, 10(3): 243-277.

Goeminne et al., "Deploying QoS sensitive services in OSGI enabled home networks based on UPnP," *Ghent University, Department of Information Technology*, Gent, Belgium, 2006, 5 pages.

Rolia et al., "Supporting application quality of service in shared resource pools," *Communications of the ACM*, 2006, 49(3): 55-60.

ShaikhAli et al., "UDDIe: An extended registry for web services," *Proceedings of the 2003 Symposium on Applications and the Internet Workshops*, 2003, 5 pages.

Virgilio et al., "Rule-based Adaptation of Web Information Systems," *World Wide Web*, 2007, 10(4): 443-470.

Chen et al., UX—An Architecture Providing QoS-Aware and Federated Support for UDDI, *Proceedings of the ICWS*, 2003, 6 pages.

Ziqiang Xu, "Reputation-Enhanced web services discovery with QoS," *Master's Thesis, Queen's University*, Kingston, ON, Canada, 2006, 102 pages.

Maximilien and Singh, "A Framework and Ontology for Dynamic Web Services Selection," *IEEE Internet Computing*, 2004, pp. 84-93.

Al-Masri and Mahmoud, "QoS-based Discovery and Ranking of Web Services," *Proceedings of the 16th International Conference on Computer Communications and Networks*, 2007, pp. 529-534.

Cardoso et al., "Modeling Quality of Service for Workflows and Web Service Processes," *Technical Report #02-002 v2, LSDIS Lab, Computer Science, University of Georgia*, 2002, 44 pages.

Crasso et al, "Easy web service discovery: a query-by-example approach," *Science of Computer Programming*, 2008, 71(2): 144-164.

Day, "Selecting the Best Web Service," *Proceedings of the 2004 conference of the Centre for Advanced Studies on Collaborative research*, Markham, Ontario, Canada, 2004, pp. 293-307.

Gray and Salber, "Modelling and using sensed context information in the design of interactive applications," *Proceedings of 8th IFIP International Conference on Engineering for Human-Computer Interaction*, Toronto, Canada, 2001, 19 pages.

Sioutas et al., Balanced distributed web service lookup system, *Journal of Network and Computer Applications*, 2006, 14 pages.

Taher et al., "A Framework and QoS Matchmaking Algorithm for Dynamic Web Services Selection," *The Second International Conference on Innovations in Information Technology*, 2005, 10 pages.

'QoS Service Selection and Ranking with Trust and Reputation Management', [online]. Vu et al., 2006, [retrieved on Jan. 15, 2009]. Retrieved from the Internet: < http://dip.semanticweb.org/documents/Manfred-Hauswirth-CoopIS-SemanticDiscovery.pdf >, 18 pages.

Vu et al., "Towards P2P-based Semantic Web Service Discovery with QoS Support," *Workshop on Business Processes and Services, in conjunction with the Third International Conference on Business Process Management*, Nancy, France, 2005, 15 pages.

Wishart et al., "SuperstringRep: Reputation-enhanced Service Discovery," *Proceedings of the 28th Australasian Computer Science Conference*, 2005, 9 pages.

Zhou et al., "Service Discovery and Measurement based on DAML-QoS Ontology," *International World Wide Web Conference*, 2005, Chiba, Japan, 2005, pp. 1070-1071.

Zhuge and Liu, "Flexible retrieval of Web Services," *The Journal of Systems and Software*, 2004, 70: 107-116.

Delamer and Lastra, "A Peer-to-Peer Discovery Protocol for Semantic Web Services in Industrial Embedded Controllers," *31st Annual Conference of IEEE*, Piscataway, NJ, USA, 2005, pp. 2661-2667.

Guinard et al., "Discovery and On-Demand Provisioning of Real-World Web Services," *IEEE International Conference on Web Services*, Piscataway, NJ, USA, 2009, pp. 583-590.

Karnouskos et al., "Towards the Real-Time Enterprise: Service-based Integration of Heterogeneous SOA-ready Industrial Devices with Enterprise Applications," *Proceedings of the 13th IFAC Symposium on Information Control Problems in Manufacturing*, Moscow, Russia, 2009, 6 pages.

Lastra and Delamer, "Semantic Web Services in Factory Automation: Fundamental Insights and Research Roadmap," *IEEE Transactions on Industrial Informatics*, 2006, 2(1): 11.

* cited by examiner

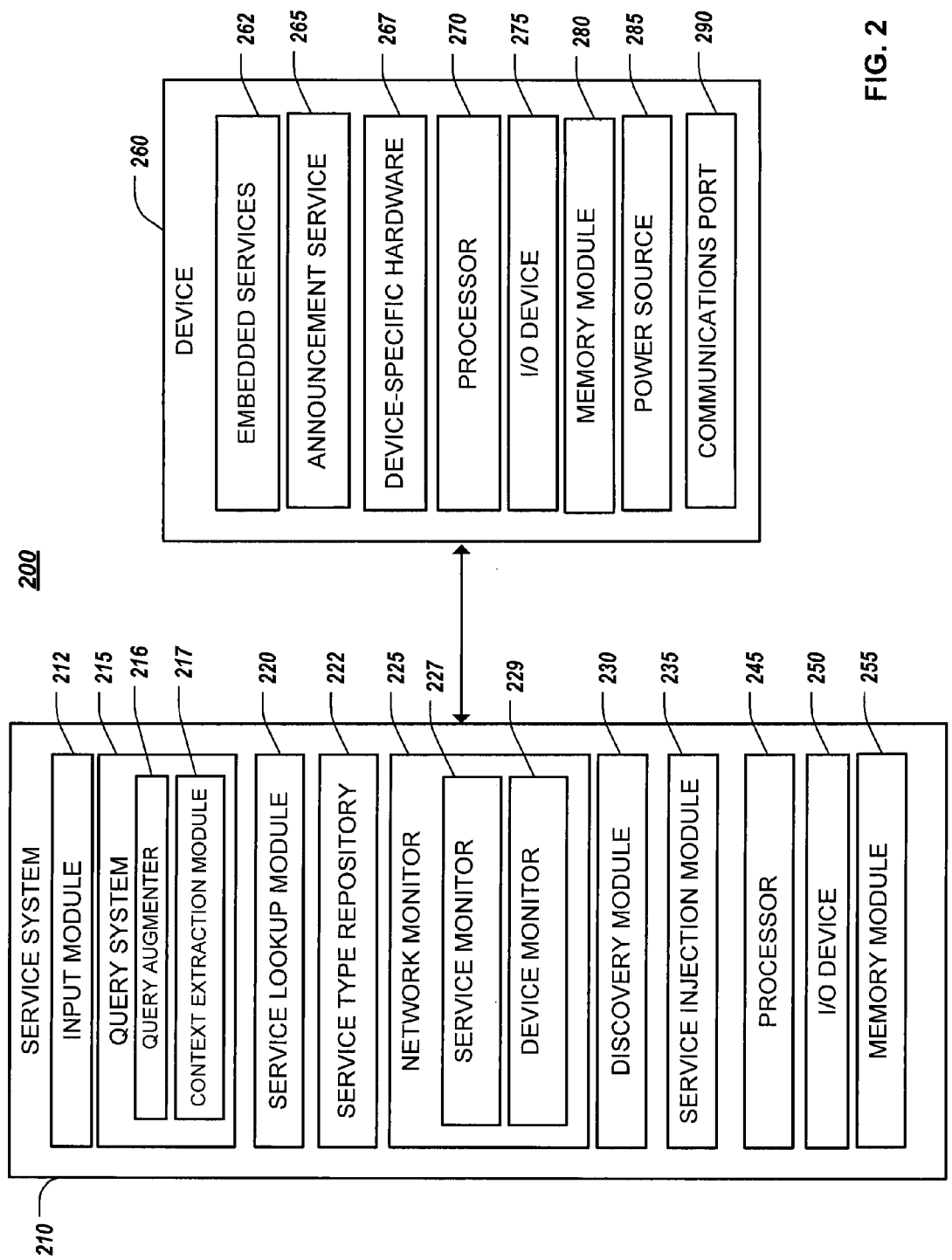

ON-DEMAND PROVISIONING OF SERVICES RUNNING ON EMBEDDED DEVICES

TECHNICAL FIELD

This description relates to on-demand provisioning of services running on embedded devices.

BACKGROUND

Web services may be deployed on embedded devices, and the services running on these devices may provide information about the device or the environment in the vicinity of the devices.

SUMMARY

In one general aspect, a user may submit a query that requests a particular type of service to a service system. The service system monitors one or more devices that are included in a network of devices to identify active instances of services currently embedded on the devices. As the set of devices that are included in the network changes, the service system is able to continuously monitor the service landscape provided by the devices as the landscape changes with the addition and removal of devices to and from the network. In some implementations, if no active instance of a service of the type requested is found, instructions that implement the missing service is installed on a device included in the network.

In another general aspect, a service type repository is populated with types of services exposed on a network that has a dynamic organization that accommodates removal of services from the network and addition of services to the network. The services are embedded on one or more devices included in the network and the services provide information about the one or more devices. A query is received that includes a request for a type of service, and the requested type of service is compared to the types of services in the service type repository to select a collection of matching service types that satisfy the request. Active instances of services that have a type included in the collection of matching service types are identified. The active instances are instances of services embedded on one or more devices included in the network. When no active instances are identified, active instances of services that have a type included in the collection of matching service types are discovered.

Implementations may include one or more of the following features. The discovered active instance may be embedded on a device added to the network after populating the service type repository. The discovered active instance may be embedded on a device included in the network when populating the service type repository, and the active instance may become active after populating the service type repository. An augmented query may be generated based on the received query. The augmented query may include the requested type of service and information related to the requested service type, and comparing the requested service to the types of services in the service type repository also may include comparing the information related to the requested type of service to the types of services in the service type repository.

The information related to the requested service may include an indication of a context in which the query was generated. The indication of the context in which the query was generated may include one or more of a location from which the query was generated and an application from which the query was generated. In some implementations, instructions that, when embedded on and executed by a device, create an active instance of a service having a type of the requested type of service may be retrieved, and the instructions may be installed on a device included in the network. The service type repository may include instructions that, when embedded on and executed by a device, create an instance of a service running on the device, and the instructions that create the active instance of the service may be retrieved from the service type repository.

In some implementations, after populating the service type repository, whether devices have been added or removed from the network may be determined to identify devices currently included in the network, types of services available from the devices currently included in the network may be determined, and the service type repository may be updated based on the services available currently included in the network. The active instances may be ranked based on one or more of a quality of each of the active instances and a location of the active instance The active instances may be displayed, and user input that selects an active instance from the display of active instances may be accepted.

The information about the one or more devices may include one or more of a type of service available from the device and a physical characteristic of the device. A physical characteristic of the device may include one or more of an amount of throughput of the device, a unique identifier of the device, an amount of available stored energy on the device, and an action the device is configured to perform. Identifying the active instances of services may include monitoring devices in the network with a device monitor to determine one or more physical characteristics of the devices included in the network and a service monitor that determines instances of services running on the devices. A service type may include a description of the service including metadata and an interface for interacting with a device on which the service is embedded. At least one of the one or more devices included in the network may be a sensor configured to sense a physical property of an area near the sensor.

In another general aspect, a system includes one or more computers and a computer-readable medium coupled to the one or more computers having instructions stored thereon which, when executed by the one or more computers, cause the one or more computers to perform operations including populating a service type repository with types of services exposed on a network that has a dynamic organization that accommodates removal of services from the network and addition of services to the network. The services are embedded on one or more devices included in the network and the services providing information about the one or more devices. A query that includes a request for a type of service is received, and the requested type of service is compared to the types of services in the service type repository to select a collection of matching service types that satisfy the request. Active instances of services that have a type included in the collection of matching service types are identified. The active instances are instances of services embedded on one or more devices included in the network. When no active instances are identified, active instances of services that have a type included in the collection of matching service types are discovered.

Implementations may include one or more of the following features. The system may include a display configured to present an interface to a user, and the instructions may further cause the one or more computers to perform operations including displaying a list the active instances on the display, and accepting user input that selects an active instance from the list of active instances. The instructions may further cause the one or more computers to perform operations, when no active instances are discovered, that include retrieving instructions that, when embedded on and executed by a device, create an active instance of a service having a type of the requested type of service, and installing the instructions on a device included in the network.

Implementations of any of the techniques described above may include a method or process, a system, a device, an apparatus, or instructions stored on a computer-readable storage device. The details of particular implementations are set forth in the accompanying drawings and description below. Other features will be apparent from the following description, including the drawings, and the claims.

DESCRIPTION OF THE DRAWINGS

FIGS. 1A-5 are block diagrams illustrating example systems for service discovery.

DETAILED DESCRIPTION

Figure 1A:
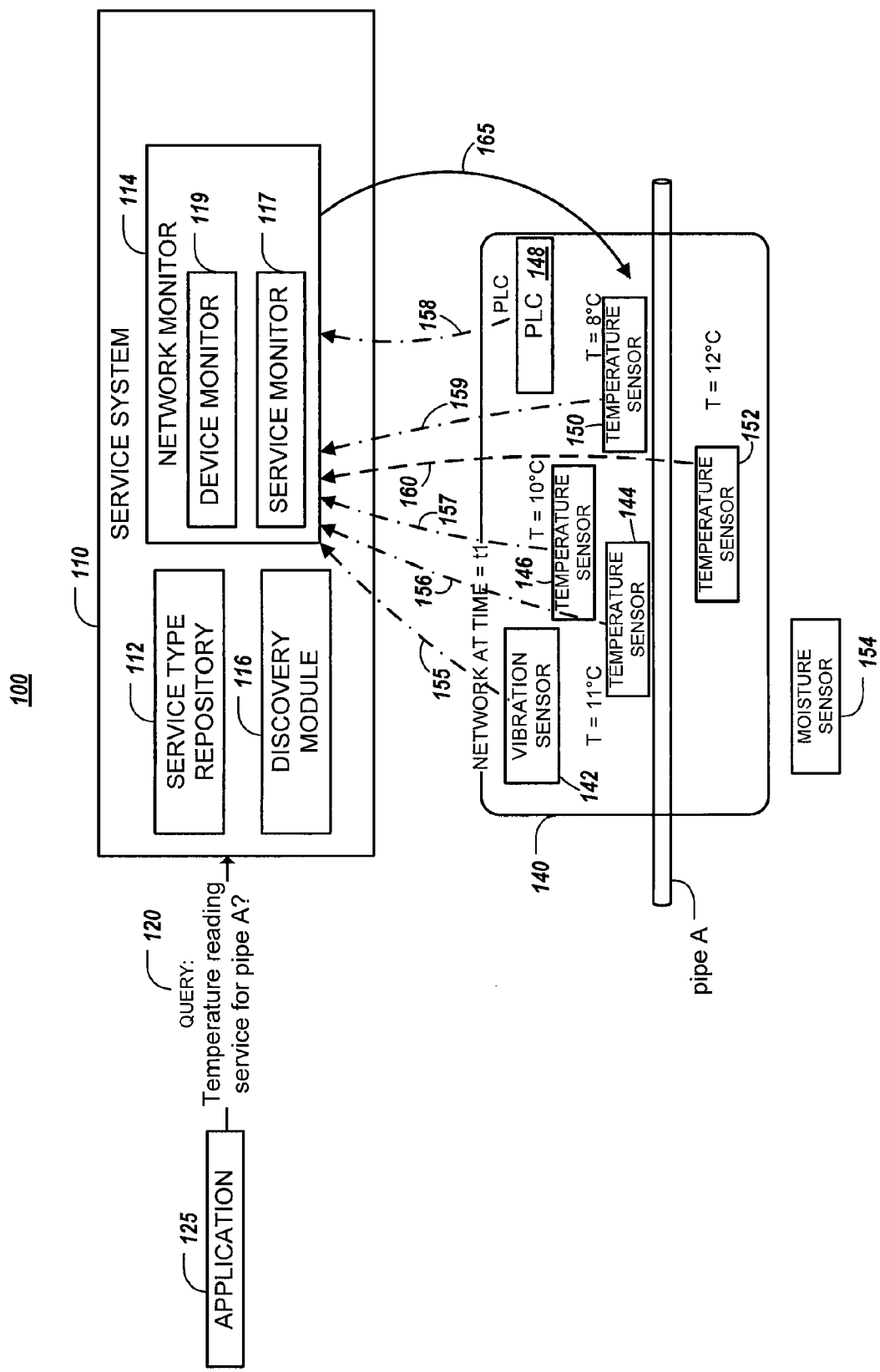
Figure 1B:
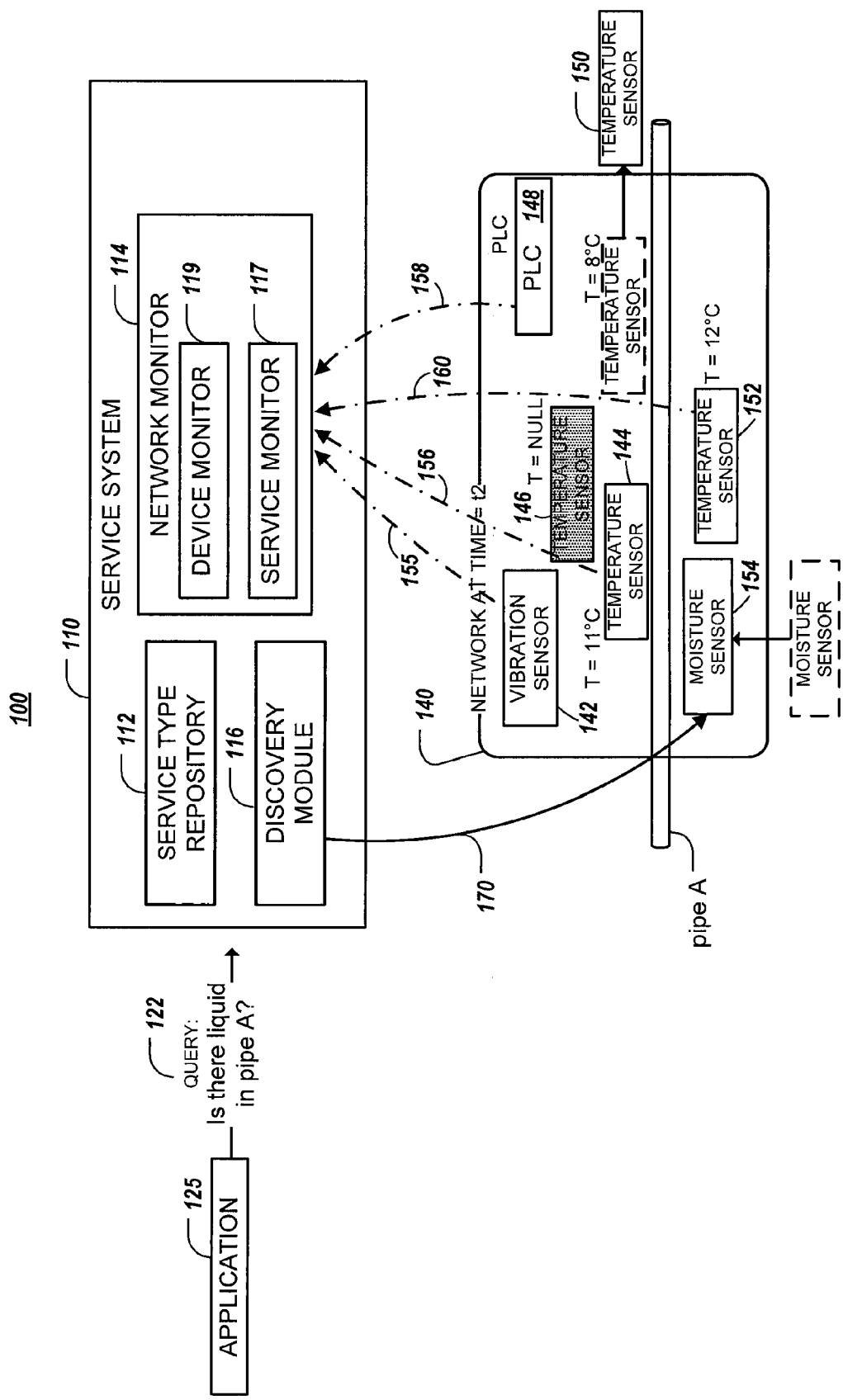
Figure 1C:
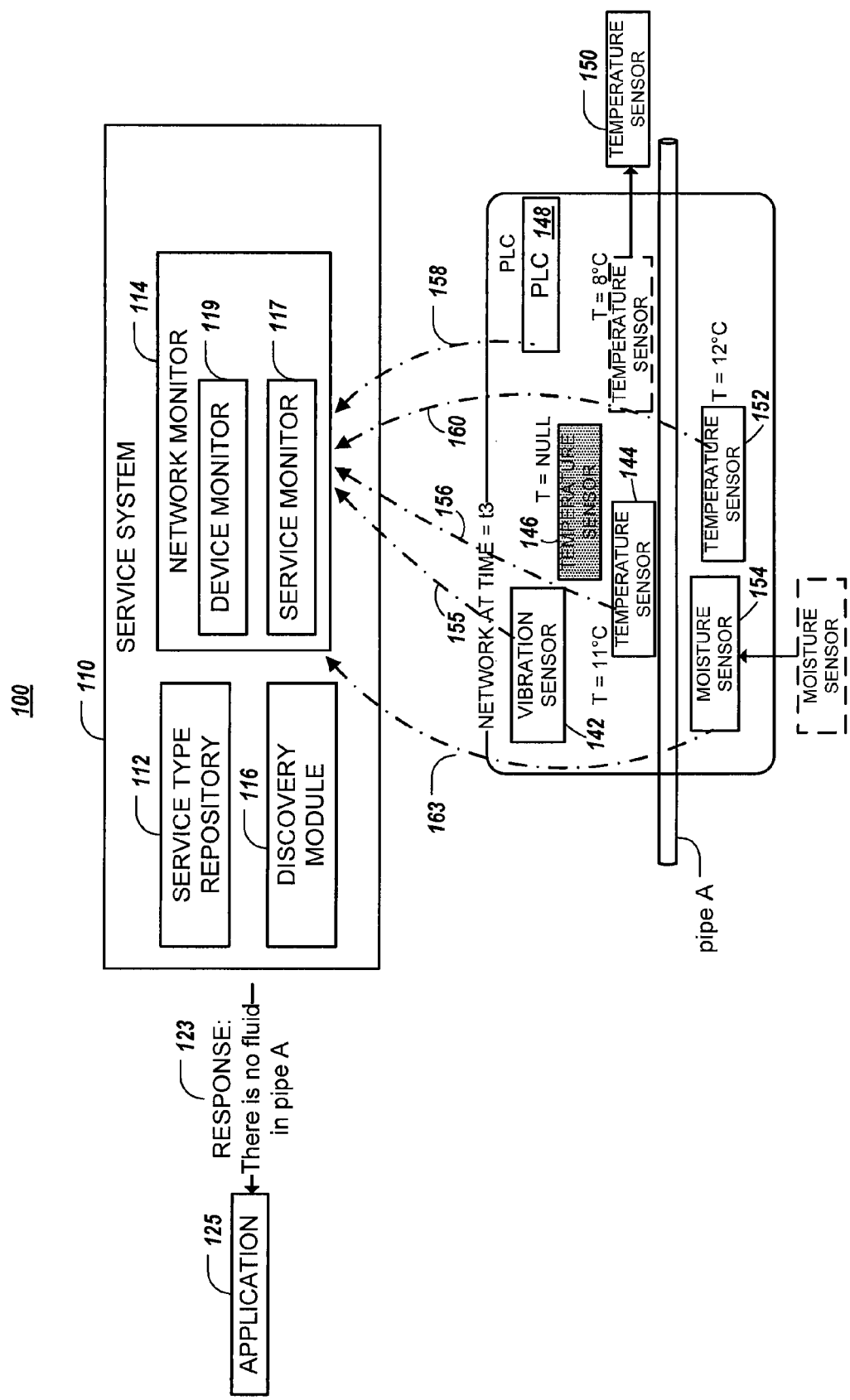

Referring to FIGS. 1A-1C, a system 100 includes a service system 110 that allows a user to search for services that are exposed on a network. The service system 110 includes a service type repository 112, a network monitor 114, and a discovery module 116. A query 120 may be submitted to the service system 110. In the example shown in FIG. 1A, the query 120 is submitted by a user of an application 125. In other examples, the query 120 may be submitted by an automated process. The query 120 may be a request to determine whether a type of service is provided by one or more devices that are included in a network 140. Devices that are in communication with the service system 110 may be considered to be included in the network 140. In some examples, no devices are included in the network 140, and, in these examples, the network 140 may be considered empty.

In the examples shown in FIGS. 1A-1C, the network 140 is a network that has a topology, or organization, that changes over time. FIG. 1A shows the network 140 at a time "t1," FIG. 1B shows the network 140 at a time "t2," and FIG. 1C shows the network at a time "t3." As shown in the examples shown in the snapshots of the system 100 at the times "t1," "t2," and "t3," the devices that are included in the network 140 may change over time. For example, the devices included in or excluded from the network may change over time as, for example, devices that were dormant come online, additional devices move into communications range of the service system 110 (e.g., if the example network is a wireless network) and/or other devices within the network 140, devices fail, and/or devices are intentionally removed from or added to the network 140 (e.g., by plugging or unplugging cables if the example network is a wired network). The network 140 may be, for example, a network of devices that are in communication with the service system 110 and/or each other.

The devices included in the network 140 may host services that provide information about the device. The network 140 may be in a factory or other manufacturing facility. Services embedded in the devices included in the network 140 may be used to, for example, allow a user who is remote from the factory to monitor processes performed by the devices included in the network 140. Because the devices that are included in the network 140 may change over time, the services that are exposed on the network 140 (e.g., the services that are available to potentially satisfy the request for a type of service made in the query 120) also may change over time.

As discussed above, the service system 110 includes a service type repository 112, a network monitor 114, and a discovery module 116. The service type repository 112 stores definitions of types of services that are exposed on the network 140. A service type definition may include a description of the service (human readable or machine processable or both), a description of an interface for interacting with a device on which the service is embedded, and other metadata. The metadata may include, for example, semantic information about message parameters, such as information that explains the meaning of data. For example, temperature readings may be reported in different units such as Fahrenheit, Celsius, and/or Kelvin, and the metadata may indicate which unit, or units, is associated with a particular reading. The metadata may include dependency information, such as information that describes what other service instances a deployed instance of the type depends on. For example, dependency information may include instances of the same or of another service type located on the same device, in network proximity, or somewhere on the network. Metadata also may be keywords that may be used to improve query results. Service types may be independent of service instances. The service type repository 112 may be, for example, a database.

The network monitor 114 includes a service monitor 117 and a device monitor 119. The device monitor 119 monitors devices that are included in the network 140 and determines one or more physical characteristics of the devices that are included in the network 140. For example, the device monitor 119 may determine an amount of throughput of a device, a unique identifier of a device, an amount of available stored energy on a device, and/or or an action a device is configured to perform. The device monitor 119 may monitor physical characteristics of devices included in the network 140 to, for example, determine a level of fitness of the services hosted by the devices that are included in the network 140. The network monitor 114 also includes the service monitor 117. The service monitor 117 monitors the service instances that are currently available to the service system 110. Thus, the service monitor 117 monitors the service instances that are running on the devices currently included in the network 140. The service instances that are running on the devices currently included in the network 140 may be referred to as the service landscape. Additionally, the service monitor 117 uses information from the device monitor 119 to determine the fitness of the services hosted by the devices that are included in the network 140.

As discussed above, the devices included in the network 140 may change over time. The devices included in the network 140 at a time "t1" include a vibration sensor 142, temperature sensors 144, 146, 150, and 152, and a PLC (Programmable Logic Controller) 148. However, a moisture sensor 154 is not included a device in the network 140 at time "t1." The devices that are included in the network 140 provide information to the network monitor 114. Thus, in the example shown in FIG. 1A, the devices 142-152 provide information to the network monitor 114, as indicated by arrows 155-160, respectively. The temperature sensors 144, 146, 150, and 152 each read a temperature of a location near the sensor, and one or more of the sensors 144, 146, 150, and 152 may have an instance of a temperature reading service. At time "t1," the temperature sensor 144 produces a temperature reading of 11 degrees Celsius (° C.) and the temperature sensor 150 produces a reading of eight degrees Celsius. The temperature sensors 146 and 152 can read temperatures of other objects in the network 140.

In response to the query 120, the service system 110 may compare the requested type of service to service types stored in the service type repository 112 to select a collection of matching service types that satisfy the query 120. In some implementations, and as discussed more below with respect to FIGS. 3 and 4, the query 120 may be augmented with contextual and semantic information before a comparison is performed. After matching service types have been identified, the service system 110 may identify active service instances that are embedded on one or more devices. Active service instances are instances of services currently running, executing, or otherwise available on one or more devices included in the network 140 and that are of the same type as the type of service included in the collection of matching service types. For example, for the query 120 requesting a service of reading a temperature of a particular object (e.g., pipe "A"), a first active instance of a temperature reading service embedded on the temperature sensor 144 and a second active instance of a temperature reading service embedded on the temperature sensor 150 may be determined.

Determined active service instances which are capable of satisfying the query 120 may be ranked. For example, instances may be ranked on a quality of service (QoS) measurement. In some implementations, the ranking may be based on the closeness of the current context of the user (e.g., location, application currently used, etc.) to the corresponding context of the service instance (e.g., physical proximity and/or measure of relatedness to user application). The ranking of instances also may be based on a combination of such context comparisons rather than on a single context comparison. In some implementations, active instances (e.g., all active instances or active instances meeting a certain criteria) may be displayed to the user (e.g., on an interface presented by the application 125). For example, active instances having a service quality measurement exceeding a threshold may be displayed for selection. The user may select an active instance, for example from a list of displayed active instances. The user may choose to invoke the service provided by the selected active instance.

For instance, for the example query 120, the user may be presented with a list of service instances which include a temperature reading service instance offered by the temperature sensor 144 and a temperature reading service instance offered by the temperature sensor 150. Suppose the user selects a temperature reading service instance offered by the temperature sensor 150 and suppose also that the user selects an option to invoke the corresponding service. In this example, the user may be presented with an output of the temperature reading service (e.g., 11 degrees Celsius). A request to invoke the temperature reading service may be communicated to the temperature sensor 150 by a message 165. In an example implementation, the message 165 may be a SOAP message sent to a web service that runs on the device and the device may reply by a SOAP response that includes the requested value. In yet another example implementation, the temperature service may send unsolicited messages that are cached by the service monitor and the last read value may be presented to the requesting user or application.

The network 140 has a dynamic organization that accommodates removal of services from the network 140 and addition of services to the network 140. For example, a service instance may be embedded on a device that is added to the network 140 after initial population of the service type repository 112. Thus, in some examples, the type of service that is embedded on the newly added device is not included in the service type repository 112. As another example, a service instance embedded on a device may be inactive when the service type repository 112 is initially populated and may later become active. Other examples of occurrences that may lead to the removal or addition of services that are exposed on the network 140 include the physical removal or failure of a device.

If no active service instances are identified by an initial search for a service instance matching the user's request, the discovery module 116 may determine if active service instances exist that were not known beforehand. For example, the discovery module 116 may identify service instances that have not yet been registered. The discovery module 116 may determine whether devices have been added or removed from the network 140, which types of services are available from the devices currently included in the network 140, and may update the service type repository 112 with updated service type information.

For example, referring to the example shown in FIG. 1B, at a time "t2", the temperature sensor 146 has failed, a temperature reading service instance that was active at the time "t1" is no longer active, and there is no longer communication between the temperature sensor 146 and the device monitor 119. Also, at time "t2", the temperature sensor 150 has been removed, or unregistered from the network 140, and there is no longer communication between the temperature sensor 150 and the device monitor 114. The failure of the temperature sensor 146 and the removal of the temperature sensor 150 may be discovered by the discovery module 116.

Also at time "t2", the moisture sensor 154 is included in the network 140. The moisture sensor 154 may be discovered by the discovery module 116. The discovery module 116 may broadcast (or multicast or groupcast) a message to all or all the relevant devices exposed on the network 140. For example, a message 170 from the discovery module 116 may be received by the moisture sensor 154, requesting that the moisture sensor 154 respond with information indicating the types of services available from the moisture sensor 154. In some implementations, the service type repository 112 may be updated based on the response from the moisture sensor 154.

In the example shown in FIG. 1B, a query 122 requesting a moisture sensing service is received from the application 125. In this example, the query asks whether there is liquid in pipe "A," and the service system 110 determines that a moisture sensing service offered by the moisture sensor 154 can satisfy the request included in the query 122. Thus, even though the moisture sensor 154 was added to the network 140 after the population of the service type repository 112 and the service type repository 112 may not list moisture sensing as a service, the system 110 is able to discover the newly added sensor 154 with the discovery module 116.

Referring to FIG. 1C, at a time "t3", the moisture sensor 154 is active and is communicating with the network monitor 114, as indicated by a connection 163. The user may select and request to invoke a moisture sensing service instance running on the moisture sensor 154, which results in the sending of a response 123 to the application 125 indicating the status of the object as provided by the requested service. In this example, the moisture sensing service running on the moisture sensor 154 indicates that there is no fluid in pipe "A".

If the discovery module 116 does not find active instances capable of satisfying the request included in the received query (e.g., a query such as the query 120 or the query 122), the service system 110 may create an active instance having a type of the requested type of service. A device capable of hosting a requested service may be identified. Instructions may be retrieved from the service type repository 112 and installed on the identified device. For example, an application or user may request a temperature reading expressed in degrees Kelvin. The service system 110 finds a suitable temperature service type in the service type repository 112, but because the temperature sensors included in the network 140 currently only have the instances of the Celsius version of the temperature service installed, no matching services instances are found, either in the service type repository 112 or by forced discovery performed by the forced discovery module 116. Thus, the service system 110 may determine that the temperature sensors include in the network 140 are capable of running the Kelvin version of the service type and install a new hosted service instance on the temperature sensors. The temperature sensors subsequently deliver the temperature values in Kelvin as requested.

Referring to FIG. 2, a system 200 includes a service system 210 that allows a user to search for services exposed on a network that includes zero or more devices such as a device 260. When the network includes zero devices, the network may be considered empty. The service system 210 may be similar to the service system 110 and the device 260 may be similar to the devices 142-152, both of which are discussed above with respect to FIG. 1. The service system 210 includes an input module 212, a query system 215, a service lookup module 220, a service type repository 222, a network monitor 225, a discovery module 230, a service injection module 235, a processor 245, one or more I/O (input/output) devices 250, and a memory module 255. The service system 210 may communicate with one or more devices 260.

The input module 212 may accept input from a user and/or from an automated process. That is, in some implementations, the user of the service system 210 may be a machine and the user input may be received from an automated process running on the machine and in other implementations the user may be a person that interacts with the service system 210 directly. In some implementations, the user of the service system 210 may be an application, such as an Enterprise Resource Planning (EPR) or Customer Relations Management (CRM) application. The input module 212 may, for example, accept a query input that includes a request for a particular type of service. The input module 212 also may, for example, accept user input that selects an active service instance from a display of one or more active service instances capable of satisfying a request for a type of service.

In the example shown in FIG. 2, the query system 215 includes a query augmenter 216 and a context extraction module 217. The query augmenter 216 may augment a received query with contextual and semantic information. An augmented query may include, for example, a requested type of service and information relating to the requested type of service. Information relating to the requested type of service may be determined as a result of the query augmenter 216 performing one or more query strategies. For example, a query strategy may involve determining one or more search words to add to a received query based on semantics and ontologies. In another example, a query strategy may include determining synonyms for the words in the query and adding the synonyms to the query to produce the augmented query.

The query augmenter 216 also may augment a query with contextual information extracted by the context extraction module 217. Extracted contextual information may indicate a context in which a query was generated. For example, contextual information may include a location from which the query was generated and an application from which the query was generated. Determining an application from which the query was generated may further indicate an application type, such as ERP (Enterprise Resource Planning), CRM (Customer Resource Management), or a database monitoring tool. The location from which the query was generated may be used to, for example, locate those devices that are running instances of a requested type of service and are within a certain physical proximity of the location from which the query was generated.

The service lookup module 220 may compare an augmented query received from the query augmenter 216 to types of services stored in the service type repository 222 to create a collection of matching service types that satisfy a requested type of service. The service lookup module 220 may identify active instances of services that have a type included in the collection of matching service types, where the active instances are instances of services that are running and embedded on one or more devices 260. Active service instances may be ranked according to a ranking algorithm. For example, the collection of matching service types may include more than one active service instance, and those active service instances may be ranked. In some implementations, the active service instances may be ranked according to a determined quality of service measurements of the service instance. The determined quality of service of a particular service instance provides a measure of the quality and reliability of the service. The quality of service may be based, in part, on one or more quality of service measurements of the device 260 that the service instance is installed on. For example, the device 260 may be a temperature sensor on which a temperature service is embedded. The quality of the temperature service may be determined based on the variation of the temperature reading produced by the temperature sensor (and provided by the temperature service) when the temperature sensor is placed in an area of constant temperature. For example, if the temperature sensor produces a wide variation of temperature readings while the temperature of the region around the temperature sensor is constant, the quality of the temperature service embedded on the temperature sensor would be considered to be rather poor. In contrast, if the temperature sensor produced a relatively constant temperature in this type of environment, the temperature service would be considered to be of relatively high quality. In another example, a location sensor that can sense location at a frequency of 10 Hz (ten times per second) is assumed to deliver a higher QoS (quality of service) than a location sensor that measures location at a frequency of 0.1 Hz (once every ten seconds).

The service type repository 222 stores definitions of types of services. The service type repository 222 may be similar to the service type repository 112 discussed above with respect to FIG. 1. Service types are descriptions of services that are independent of a particular running instance of a service. A service type definition associated with one or more services may include a description of the service, a description of an interface for interacting with a device on which the service is embedded, and other metadata. In some implementations, a service type may be described using an WSDL (Web Service Definition Language) description (e.g., a description without a concrete endpoint reference). In another example, the service may be described as a set of extensible Markup Language (XML) schemas to describe a REST-like interface, but without concrete resource Uniform Resource Locators (URLs). A REST-like interface may also be described in the Web Application Description Language (WADL) or the Web Service Description Language (WSDL 2.0), which also supports REST interfaces. In yet another example, the interface may be described as names of name-value pairs of a distributed knowledge base. In this implementations, communication with the service includes reading and writing the values of the name-value pairs. Service types may be independent of service instances.

The service type repository 222 may be, for example, a relational database that logically organizes data into a series of database tables. Each database table arranges data in a series of columns (where each column represents an attribute of the data stored in the database) and rows (where each row represents attribute values). The service type repository 222 may be, for example, an object-oriented database that logically or physically organizes data into a series of objects. Each object may be associated with a series of attribute values. The service type repository 222 also may be a type of database management system that is not necessarily a relational or object-oriented database. For example, a series of XML (eXtensible Markup Language) files or documents may be used, where each XML file or document includes attributes and attribute values. In another example, XML pieces may be stored in the database.

The service system 210 also includes the network monitor 225. The network monitor 225 includes a service monitor 227 and a device monitor 229. The network monitor 225 may be similar to the network monitor 114, and the service monitor 227 may be similar to the service monitor 117, both of which are discussed above with respect to FIG. 1. The service monitor 227 monitors devices included in the network to determine instances of services that are currently exposed on the network. The service monitor 227 determines instances of services running on the device 260. The service monitor 227 monitors the service instances that are currently available to the service system 110. That is, the service monitor 227 monitors the service instances that are running on the devices 260. Additionally, the service monitor 227 uses information from the device monitor 229 to determine the fitness of the services hosted by the devices 260.

The device monitor 229 monitors devices, such as the device 260, that are included in the network. In some implementations, the device monitor 229 monitors the devices constantly. The device monitor 229 determines one or more physical characteristics of the device 260. The device monitor 229 may be similar to the device monitor 119 discussed above with respect to FIG. 1. For example, the device monitor 229 may determine an amount of throughput of a device 260, a unique identifier of a device 260, an amount of available stored energy on a device 260, or an action a device 260 is configured to perform. The device monitor 119 may monitor physical characteristics of devices 260, for example, to determine a level of fitness of the services hosted by the devices 260.

The service system 210 also includes the discovery module 230. The discovery module 230 may be similar to the discovery module 116 discussed above with respect to FIG. 1. For example, if no active service instances are identified by the service lookup module 220, the discovery module 230 may determine if active service instances exist that were not known beforehand. For example, the discovery module 230 may identify service instances that have not yet been registered in the service type repository 222 and/or may determine whether devices 260 that are running services have been added or removed from a network. In some implementations, the discovery module 230 may determine types of services available from the devices 260, and may update the service type repository 222 with updated service type information. Newly discovered service types can be automatically added to the service type repository 222, or new service types can be added after a user reviews the newly discovered service types and determines which service types to add to the service type repository 222. As another example, newly discovered service types can be selectively added to the service type repository 222, based on criteria, such as if a device owner identifier is included in a set of recognized identifiers (e.g., to only add newly discovered service types announced from recognized devices).

If no active instances are discovered by the discovery module 230, the service injection module 235 may create an active instance of a service having a type of a requested service type. To create the active instance of a service, the service injection module 235 may retrieve instructions from the service type repository 222. The service injection module 235 may install the retrieved instructions on the device 260. When embedded on and executed by the device 260, the retrieved instructions create an active service instance.

The service system 210 also includes the processor 245. The processor 245 may be a processor suitable for the execution of a computer program such as a general or special purpose microprocessor, and any one or more processors of any kind of digital computer. In some implementations, the service system 210 includes more than one processor 245. The processor 245 may receive instructions and data from the memory module 255. The memory module 255 may store instructions and data corresponding to any or all of the components of the service system 210. The memory module 255 may include read-only memory, random-access memory, or both.

The I/O devices 250 are configured to provide input and/or output to/from the service system 210. For example, the I/O devices 250 may include a mouse, a keyboard, a stylus, or any other device that allows the input of data into the service system 210 or otherwise communicate with the service system 210. The I/O devices 250 may also include a display, a printer, or any other device that accepts data from the service system 210 and outputs the accepted data to a user of the service system 210 For example, in some implementations, the active instances of services having a type that is included in the collection of matching service types from the service type repository 222 may be shown on a display such that a user of the service system 210 may select one or more active instances.

The service system 210 is in communication with a network of devices such as the device 260. The example device 260 shown in FIG. 2 includes embedded services 262, an announcement service 265, device-specific hardware 267, a processor 270, one or more I/O devices 275, a memory module 280, a power source 285, and a communications port 290. The embedded services 262 provide information about the device 260 and/or trigger functionality of the device 260. For example, the device 260 may be a temperature sensor, and a temperature reading service embedded on the temperature sensor may read and output a value produced by the temperature sensor. The embedded services 262 may provide information about a physical characteristic of the device 260. A physical characteristic may be, for example, an amount of throughput of the device 260, a unique identifier of the device 260, an amount of available stored energy on the device 260, or an action the device 260 is configured to perform. Continuing the example of the device 260 being a temperature sensor, the physical characteristic may be an identifier of the device that indicates that the temperature sensor is located in an oven that is used to in the manufacture gourmet cat food that is specially formulated for tonkinese cats. Another example of a physical characteristic of such a temperature sensor is the type of temperature sensing element included in the temperature sensor. For example, the temperature sensor may be identified as including a thermocouple.

The announcement service 265 may provide information about the types of services provided by the device 260. For example, the discovery module 230 may send a broadcast message requesting that all devices 260 announce their available services and the devices 260 may respond using the announcement service 265. Additionally, the device 360 may, without prompting from another system, use the announcement service 265 to announce available services when the device 360 comes online or becomes active or announces these periodically or at random intervals.

Each type of device 260 may include device-specific hardware 267. For example, a temperature sensor may include hardware for sensing temperature, an identifier reader device may include an RFID (Radio Frequency Identification) reader and/or a barcode reader, and a vibration sensor may include hardware for detecting vibration. The device 260 may also include or communicate with the one or more I/O devices 275. The I/O devices 275 provide input and/or output to/from the device 260.

The processor 270 may be a processor suitable for the execution of a computer program such as a general or special purpose microprocessor, and any one or more processors of any kind of digital computer. The processor 270 may receive instructions and data from the memory module 280. In some implementations, the device 260 includes more than one processor 270. The memory module 280 may include read-only memory, random-access memory, or both.

In some implementations, the power source 285 may be a portable power source that is included within the device 260, such as a battery. In other implementations, the power source 285 may be external to the device 260. In yet other implementations, the power source 285 is integrated with the device 260. The communications port 290 allows the device 260 to communicate with the service system 210 and with other devices. The communications port 290 may accept wireless or wired data connections with the other devices. In some implementations, the communications port 290 includes both wireless and wired data connections.

Figure 3:
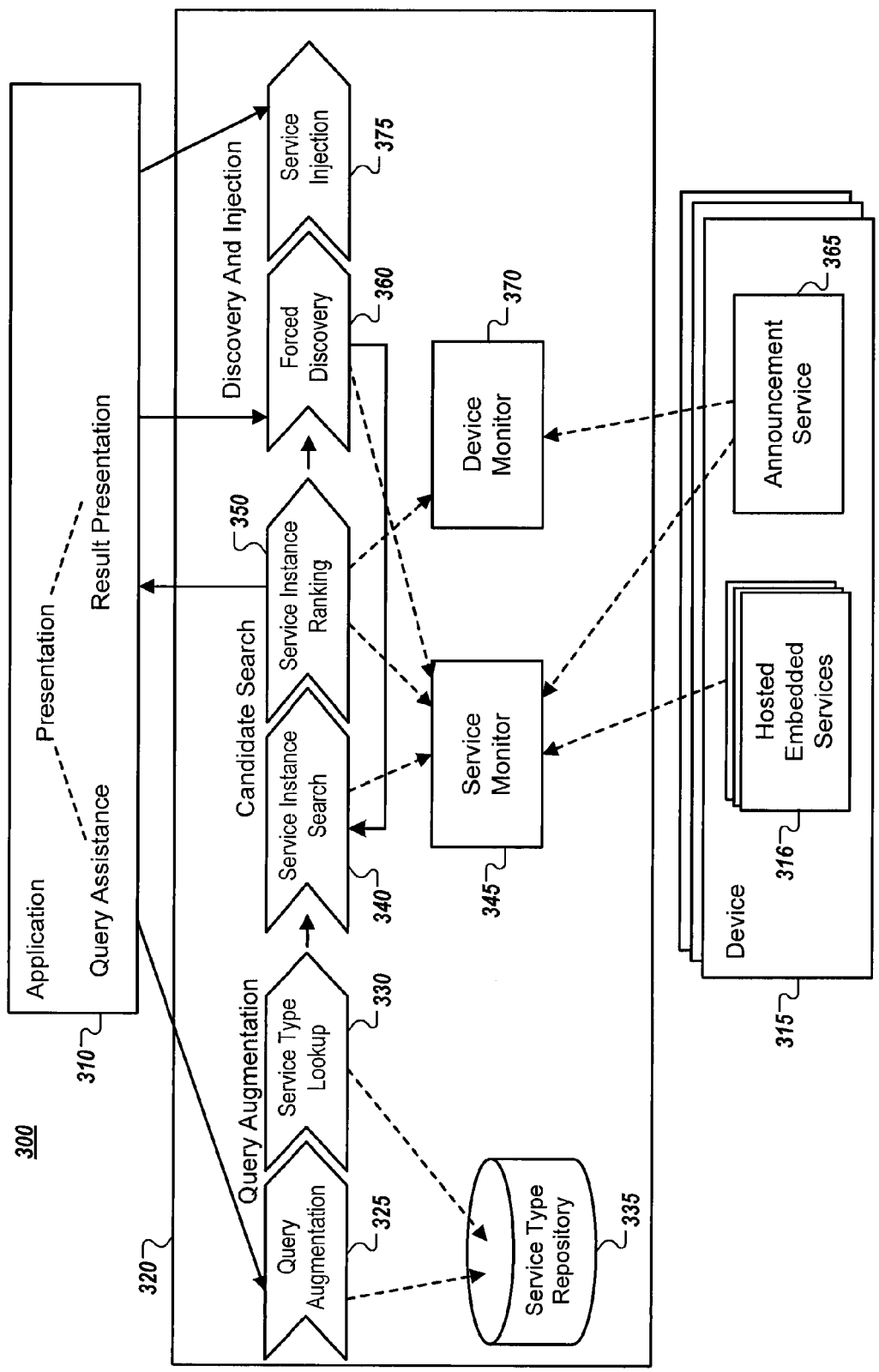

Referring to FIG. 3, a system 300 includes an application 310. The application 310 may allow a user to input a query to determine whether a type of service is provided by one or more devices 315. The device 315 may include one or more hosted embedded services 316. For example, in a warehouse environment, various devices may be included in a network and these devices may act to control a conveyor belt system that is in the warehouse. The various devices may include a vibration sensor that offers a service to communicate a sensed degree of vibration of the conveyor belt. A temperature sensor may offer a service that communicates a sensed temperature of a motor powering the conveyor belt. Another sensor may offer a service communicating the speed of the motor. A proximity sensor may offer a service that communicates whether or not an object is in front of the sensor (e.g., such a sensor may be used to determine whether an object has reached the end of the conveyor belt). In some implementations, the embedded service 316 is a software component implementing an action that can be triggered (e.g., invoked) by a client of the device 315.

The query received by the application 310 may be submitted to a service system 320. The query may request a particular service. The service system 320 may use a query augmentation module 325 to augment the received query with context and semantics. A service type lookup module 330 may compare an augmented query received from the query augmentation module 320 to types of services stored in a service type repository 335 to create a collection of matching service types that satisfy the requested type of service.

Figure 4:
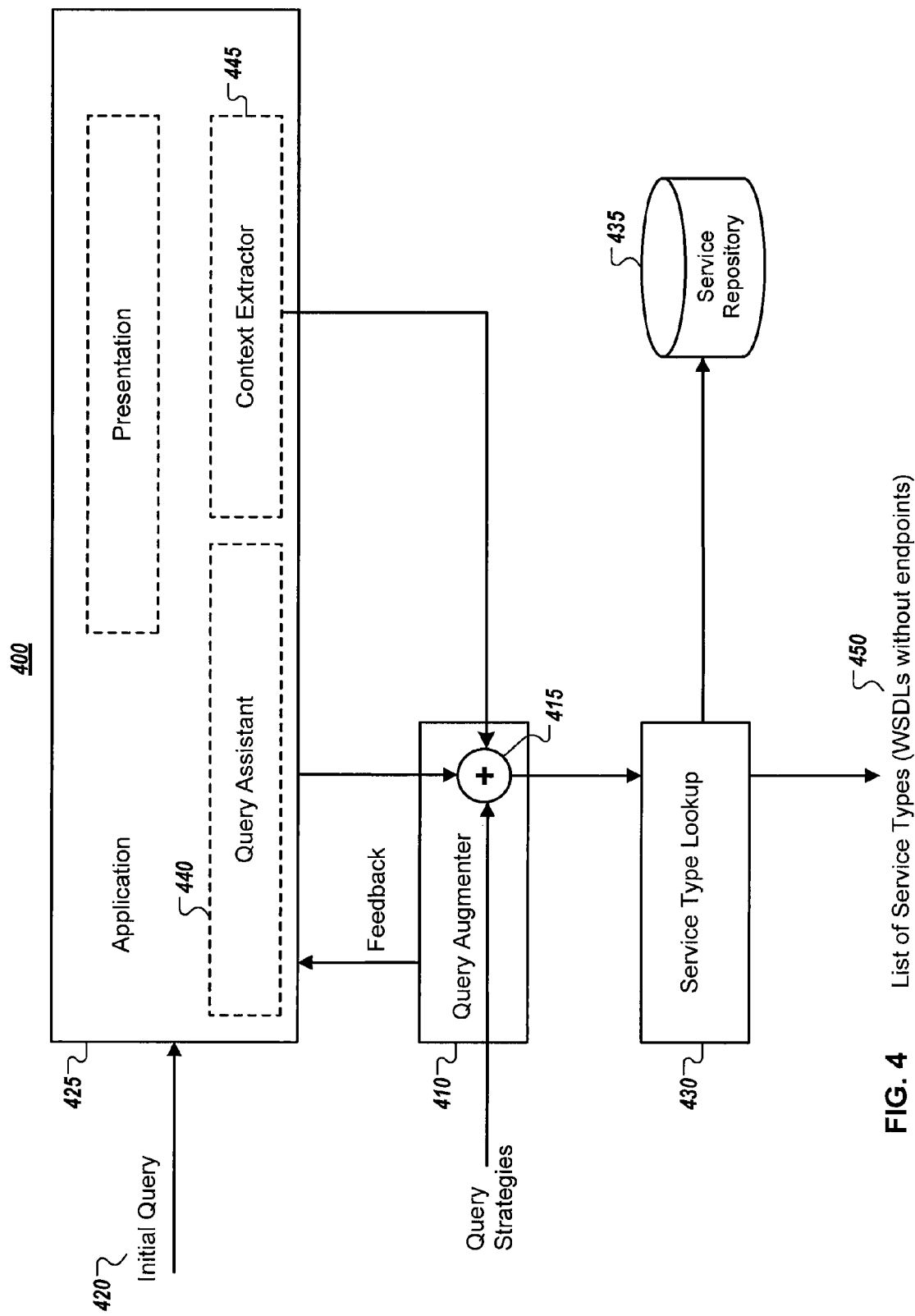

In a more detailed example and as shown in FIG. 4, a query augmenter 410 can use one or more query strategies 415 to enhance an initial query 420 inputted into an application 425.

For example, the initial query 420 may include a search phrase that includes one or more search keywords. A query strategy may be employed which looks up each user-entered keyword in a thesaurus, online encyclopedia, or other resource to find additional keywords which are synonyms of or otherwise related to user-entered keywords (e.g., translations of the user-entered keyword into another language or into a numeric code). The additional keywords may be added to the user-entered keywords. Other query strategies may be used.

As a more specific example, suppose the initial query 420 is a request to determine whether an "identification reading service" is available. The query augmenter 410 may employ the query strategy 415 to find additional keywords, such as "bar code" and "RFID", that are related to the query 420. The augmented query can be presented as a suggested query to the user using a query assistant module 440. The query assistant module 440 may allow the user to accept or reject the suggested additional keywords. In some implementations, the additional keywords determined by the query augmenter 410 are automatically added to the initial query 420 without user involvement.

As another example, the initial query 420 is entered in the context of the conveyor belt system example described above, and the initial query 420 is a search phrase of "belt speed" intended to determine whether there is a service available to determine the speed of a conveyor belt. The query augmenter 410 may find additional keywords or phrases, such as "conveyor", "motor speed", and/or "velocity", and/or "Geschwindigkeit" (e.g., the German translation).

The user query 420 may also be augmented by contextual information extracted by a context extractor 445. For example, the user's location may be identified and it may be determined that the user's location is relevant to the query 420. In the example where the query 420 is a request for an identification reading service, the user's location may be relevant because an identification reading device located in close proximity to the user may be more useful than a device located farther away from the user. The location of the user may be determined, for example, based on a determined location of a display terminal that a user uses to enter the query 420. For example, the user may be working in a warehouse that has many display terminals. Other contextual information may be relevant to the query 420. For example, the type of application (e.g., ERP, CRM, or other application) may be relevant to the query 420.

A service type lookup module 430 may search a service type repository 435 for service types which may relate to the augmented query. The service type lookup module 430 may produce a list of service types 450 which satisfy the initial query 420. In some implementations, the list of service types 450 is a set of WSDL elements which do not include endpoints.

Returning to FIG. 3, a service instance search module 340 may determine one or more active service instances embedded on one or more devices 315 that have a type included in the collection of matching service types produced by the service type lookup module 330. For example, a service monitor 345 may monitor the service instances that are currently available to the service system 320. Multiple service instances having a type included in the collection of matching service types may be identified. For example, multiple service instances may have the same interface and provide the same or similar functionality. If exactly one active service instance is identified, the identified service instance may be presented to the user in a presentation interface of the application 310. If more than one active service instance is identified, the identified active service instances may be ranked by a service instance ranking module 350 according to how relevant each service instance is to the user's request. Active instances (e.g., all active instances or active instances meeting a certain criteria) may be displayed to the user (e.g., on an interface presented on the application 310). The user may select an active instance, for example from a list of displayed active instances. The user may choose to invoke the service provided by the selected active instance.

Figure 5:
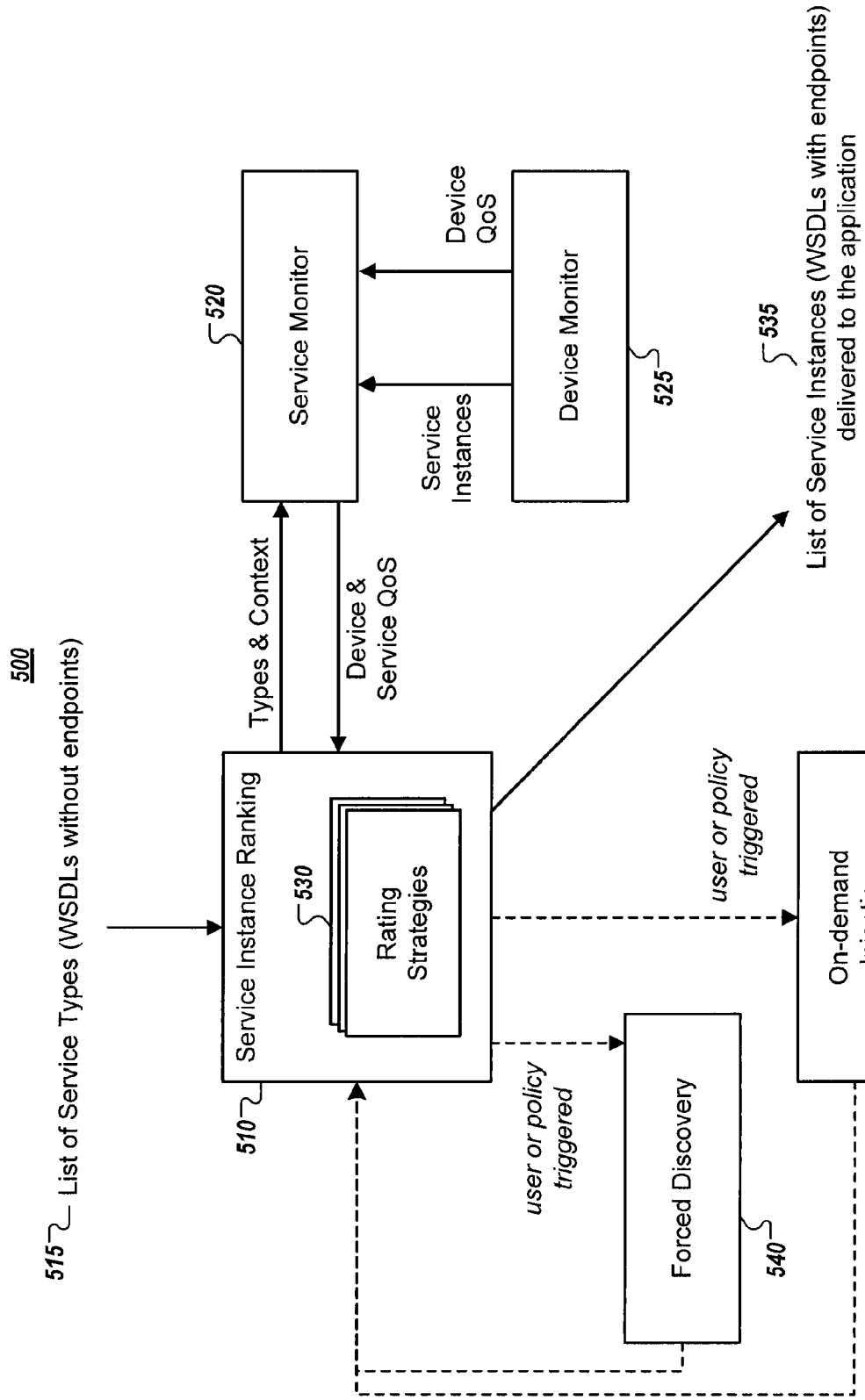

In a more detailed example, and as shown in FIG. 5, a service instance ranking module 510 receives a list of service types 515 (e.g., a set of WSDL elements without endpoints, such as produced by the service type lookup module 430 of FIG. 4). The service instance ranking module 510 may send the list of service types 515, as well as context information (e.g., context information extracted by the context extractor 445 of FIG. 4) to a service monitor 520. The service monitor 520 may find all currently available service instances having a type included in the list of service types 515 that also have a context related to the context information.

The service monitor 520 may also use information from a device monitor 525 to determine the fitness of the currently available service instances. For example, the device monitor 525 may determine one or more physical characteristics of each device hosting one or more active service instances. For example, the device monitor 525 may determine an amount of throughput of the device, a unique identifier of the device, or an amount of available stored energy on the device.

The determined physical characteristics may collectively indicate a quality of service for the device. For example, the device monitor 525 may determine a low level of stored-energy-remaining on a particular device. The service monitor 520 may, in turn, deem that the performance of the device is relatively poor, because the device's ability to offer services may not be reliable in the near future.

The service monitor 520 may also determine a quality of service for each of the active service instances. For example, a quality-of-service of a service instance may be based on historical performance of the service. For example, some service instances may have historically produced more consistent, accurate and precise results than other service instances. Some service instances, for example, may have a history of producing erroneous and/or inconsistent results (e.g., results with a significant number of invalid, or outlier values). Quality of service for a service may be application-dependent and may be based on any application-specific criteria.

The service instance ranking module 510 receives a list of active service instances from the service monitor 520, along with associated device and service quality-of-service information. The service instance ranking module 510 may rank service instances according to one or more rating strategies 530. A rating strategy 530 is an algorithm that may take into account device and service quality-of-service, along with how well each service instance matches the context of the initial user query. A rating strategy 530 may be selected from a collection of rating strategies automatically, or a rating strategy 530 may be selected by the user. A quality-of-result criteria may be applied to the output of the rating strategy 530. For example, if the number of service instances having a particular (e.g., satisfactory) score is greater than a threshold, a list of service instances 535 may be delivered to the application. In some implementations, the list of service instances 535 is a set of WSDL elements with endpoints.

If the number of service instances having a satisfactory score is less than a threshold, one or more other service instances may be discovered using a forced discovery module 540. The forced discovery module 540 may be invoked automatically or may be invoked based on a user selection. If no satisfactory service instances are discovered by the forced discovery module 540, a service instance may be created by an on-demand injection module 550. The on-demand injection module 550 may be invoked automatically or may be invoked in response to a user selection.

Returning to FIG. 3, as discussed above, if no active service instances are found by ranking service instances, one or more other service instances may be discovered, such as by using a forced discovery module 360. The forced discovery module 360 may discover devices which had been previously unavailable. For example, the discovery module 116 may identify devices that have not yet been registered. The forced discovery module 360 may send a broadcast (or multicast or groupcast) message to all or all relevant devices on a network, requesting that each device 315 announce (or re-announce) available services using an announcement service 365. Service instances discovered by the forced discovery module 360 may be subsequently ranked by the service instance ranking module 350, for example, using information received from the service monitor 345 and a device monitor 370.

As mentioned above, if no satisfactory service is found by a forced discovery approach, a service instance may be created, such as by a service injection module 375. A device 315 capable of hosting a requested service may be identified. Instructions may be retrieved from the service type repository 335 and installed on the identified device 315.

Figure 6:
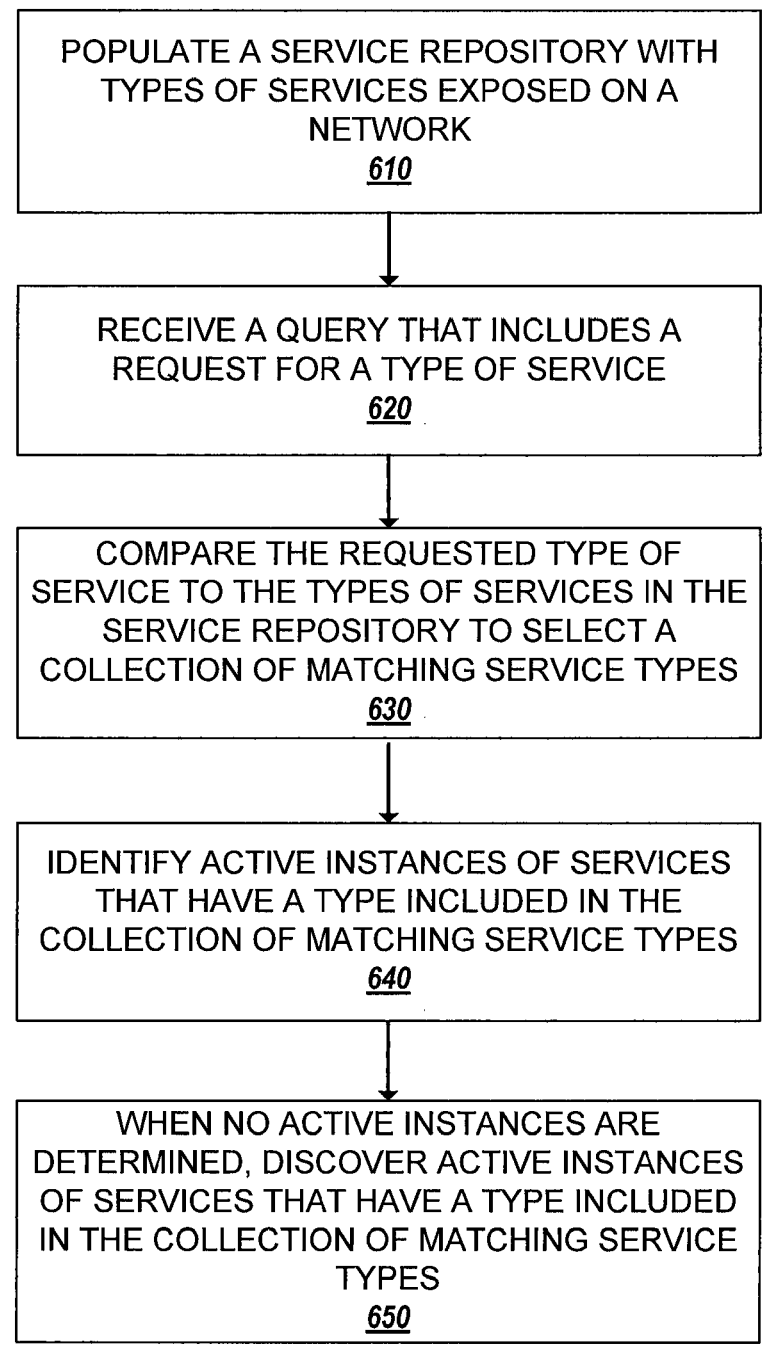
FIG. 6 shows an example process for discovering services.

Referring to FIG. 6, an example process 600 may be used to discover services. The example process 600 may be performed by one or more processors included in a service system, such as the service system 110 or the service system 210 discussed above with respect to FIGS. 1 and 2, or by a processor included in any other system.

A service type repository is populated with types of services exposed on a network (610). The types of services exposed on the network may be the services that are currently running on devices that are included in the network at the time that the service type repository is populated. For example, the service type repository 112 described above with respect to FIG. 1A may be populated.

A query that includes a request for a type of service is received (620). For example, the query 120 may be received by the service system 110, as described above with respect to FIG. 1A. As another example, a user may enter a query such as "I would like to find an RFID service". A query augmenter (e.g., query augmenter 410 described above with respect to FIG. 4) may augment the received query, such as by determining synonyms or other additional keywords related to words in the user's initial query. For example, the query augmenter 410 may determine additional, related queries, such as "I would like to find a bar code reading service" and "I would like to find a dot matrix service."

The requested type of service is compared to the types of services in the service type repository to select a collection of matching service types (630). If the service type repository includes service types that match the requested type of service, the collection of matching service types is one or more of the matching service types. The collection of matching service types may be implemented as a set of WSDL elements without endpoints.

Active instances of services that have a type included in the collection of matching service types are determined (640). For example, active instances may be determined by a service monitor (e.g., service monitor 345, as described above with respect to FIG. 3). In the example where the user is looking for an RFID service, active instances of RFID services may be determined. Determined instances may be presented to the user.

If no active instances are determined, active instances of services that have a type included in the collection of matching service types are discovered (650). For example, an RFID reader device offering an RFID service may be added to the network after the service type repository is populated. The RFID service may be discovered (e.g., by the forced discovery module 360, as described above with respect to FIG. 3) and a type definition corresponding to the discovered RFID service may be added to the service type repository. The discovered RFID service instance may be presented to the user.

Figure 7:
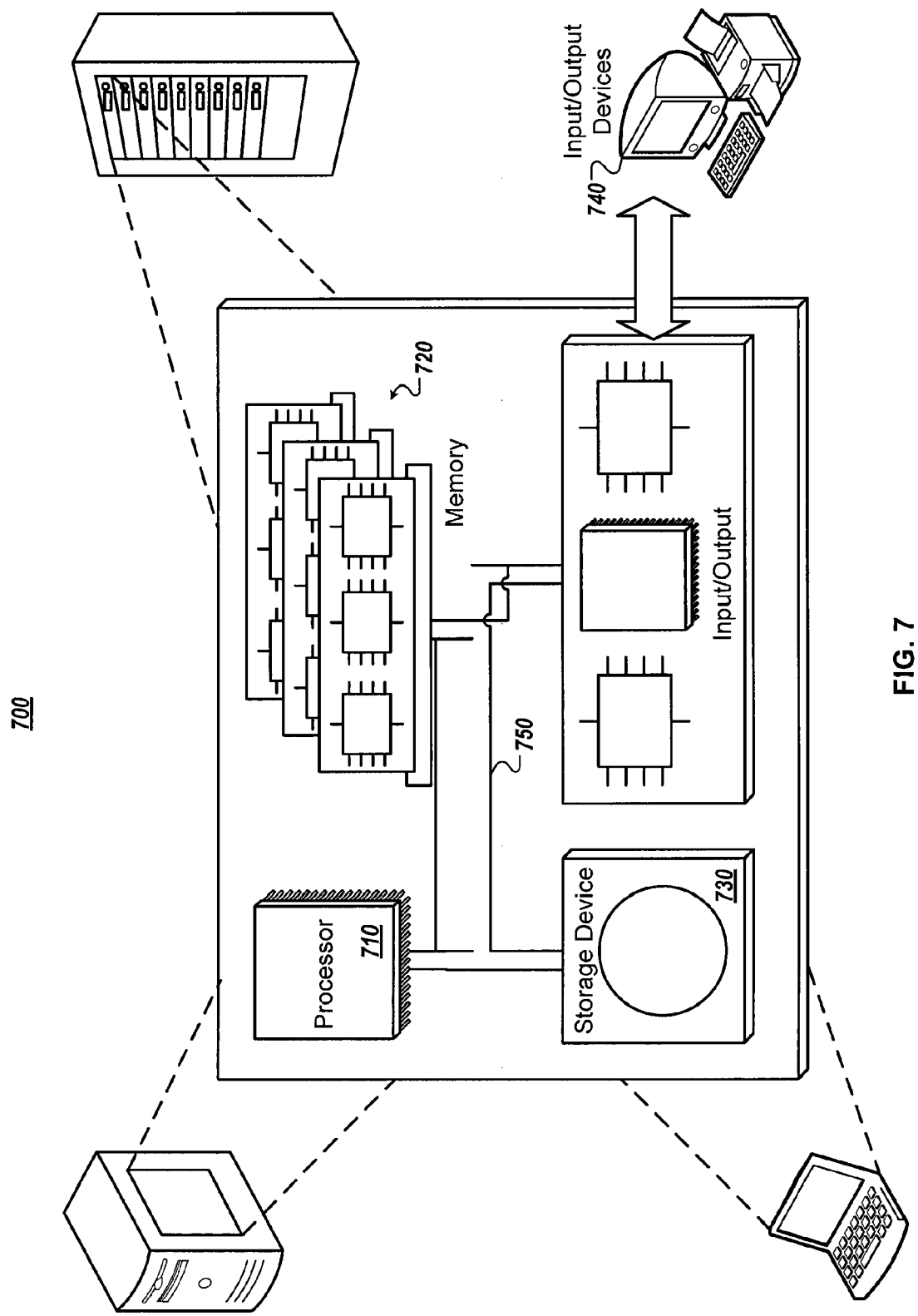
FIG. 7 shows an example computing device.

FIG. 7 is a schematic diagram of an example of a generic computer system 700. The system 700 can be used for the operations described in association with the method 600 according to one implementation.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks that form the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the scope of the disclosure. Accordingly, other implementations are within the scope of the following claims.

What is claimed is:

1. A non-transitory computer-readable medium encoded with a computer program comprising instructions that, when executed, operate to cause a computer to perform operations comprising:
   storing definitions of types of services in a service type repository, the services embedded on one or more devices included in a network, the network having a dynamic organization that accommodates removal of services from the network and addition of services to the network;
   receiving a query that includes a request for a type of service;

comparing the requested type of service to the definitions of types of services stored in the service type repository;
identifying one or more definitions of a type of service stored in the service type repository that match the requested type of service and identifying, for each matching definition of the type of service, a corresponding active service instance embedded on one or more devices included in the network;
defining a set of active service instances based on respective rating scores;
determining that a number of active service instances in the set is less than a first threshold, and in response, identifying one or more additional active service instances embedded on one or more devices included in the network that do not currently have a corresponding definition of type of service stored in the service type repository and that matches the requested type of service; and
determining that a respective rating score of each of the additional active service instances is less than a second threshold, and in response, retrieving instructions that, when embedded on and executed by a device, create an active instance of a service having a type of the requested type of service, and installing the instructions on the device included in the network.

2. The medium of claim 1, wherein identifying the one or more additional active service instances embedded on one or more devices included in the network that do not currently have a corresponding definition of type of service stored in the service type repository further includes the one or more additional active instances being embedded on the one or more devices that are added to the network after storing the definitions of types of services in the service type repository.

3. The medium of claim 1, wherein identifying the one or more additional active service instances embedded on one or more devices included in the network that do not currently have a corresponding definition of type of service stored in the service type repository further includes the one or more additional active instances being embedded on the one or more devices included in the network when storing the definitions of types of services in the service type repository and becoming active after storing the definition of types of services in the service type repository.

4. The medium of claim 1, comprising further instructions to perform operations comprising generating an augmented query based on the received query, the augmented query including the requested type of service and information related to the requested type of service, and wherein comparing the requested service to the definitions of types of services in the service type repository further comprises comparing the information related to the requested type of service to the types of services in the service type repository.

5. The medium of claim 4, wherein the information related to the requested type of service comprises an indication of a context in which the query was generated.

6. The medium of claim 5, wherein the indication of the context in which the query was generated includes one or more of a location from which the query was generated and an application from which the query was generated.

7. The medium of claim 1, wherein:
the service type repository includes instructions that, when embedded on and executed by the device, create the instance of the service running on the device, and
the instructions that create the active instance of the service are retrieved from the service type repository.

8. The medium of claim 1, comprising further instructions to perform operations comprising, after storing the definitions of types of services in the service type repository:
determining whether devices have been added or removed from the network to determine devices currently included in the network;
determining types of services available from the devices currently included in the network; and
updating the service type repository based on the services available currently included in the network.

9. The medium of claim 1, comprising further instructions to perform operations comprising ranking the active instances embedded on the devices in the network based on one or more of a quality of each of the active instances and a location of the active instance.

10. The medium of claim 1, comprising further instructions to perform operations comprising:
displaying a list of the active instances; and
accepting user input that selects an active instance from the list of active instances.

11. The medium of claim 1, wherein each of the services provides information about the respective device the service is embedded on, the information including one or more of a type of service available from the device and a physical characteristic of the device.

12. The medium of claim 11, wherein a physical characteristic of the device includes one or more of an amount of throughput of the device, a unique identifier of the device, an amount of available stored energy on the device, and an action the device is configured to perform.

13. The medium of claim 1, wherein identifying one or more definitions of a type of service stored in the service type repository that match the requested type of service and identifying, for each matching definition of the type of service, a corresponding active service instance embedded on one or more devices included in the network further includes:
monitoring devices in the network with a device monitor to determine one or more physical characteristics of the devices included in the network and a service monitor that determines instances of services running on the devices.

14. The medium of claim 1, wherein a service type comprises a description of the service including metadata and an interface for interacting with a device on which the service is embedded.

15. The medium of claim 1, wherein at least one of the one or more devices included in the network comprises a sensor configured to sense a physical property of an area near the sensor.

16. A system comprising:
one or more computers; and
a computer-readable medium coupled to the one or more computers having instructions stored thereon which, when executed by the one or more computers, cause the one or more computers to perform operations comprising:
storing definitions of types of services in a service type repository, the services embedded on one or more devices included in a network, the network having a dynamic organization that accommodates removal of services from the network and addition of services to the network;
receiving a query that includes a request for a type of service;
comparing the requested type of service to the definitions of types of services stored in the service type repository;
identifying one or more definitions of a type of service stored in the service type repository that match the requested type of service and identifying, for each matching definition of the type of service, a corresponding active service instance embedded on one or more devices included in the network;

defining a set of active service instances based on respective rating scores;

determining that a number of active service instances in the set is less than a first threshold, and in response, identifying one or more additional active service instances embedded on one or more devices included in the network that do not currently have a corresponding definition of type of service stored in the service type repository and that matches the requested type of service; and determining that a respective rating score of each of the additional active service instances is less than a second threshold, and in response, retrieving instructions that, when embedded on and executed by a device, create an active instance of a service having a type of the requested type of service, and installing the instructions on the device included in the network.

17. The system of claim 16, further comprising a display configured to present an interface to a user, and wherein the instructions further cause the one or more computers to perform operations comprising:

displaying a list of the active instances on the display; and
accepting user input that selects an active instance from the list of active instances.

18. A method comprising:

storing definitions of types of services in a service type repository, the services embedded on one or more devices included in a network, the network having a dynamic organization that accommodates removal of services from the network and addition of services to the network;

receiving a query that includes a request for a type of service;

comparing the requested type of service to the definitions of types of services stored in;

identifying one or more definitions of a type of service stored in the service type repository that match the requested type of service and identifying, for each matching definition of the type of service, a corresponding active service instance embedded on one or more devices included in the network;

defining a set of active service instances based on respective rating scores;

determining that a number of active service instances in the set is less than a first threshold, and in response, identifying one or more additional active service instances embedded on one or more devices included in the network that do not currently have a corresponding definition of type of service stored in the service type repository and that matches the requested type of service ; and determining that a respective rating score of each of the additional active service instances is less than a second threshold, and in response, retrieving instructions that, when embedded on and executed by a device, create an active instance of a service having a type of the requested type of service, and installing the instructions on the device included in the network.

19. The medium of claim 1, wherein the one or more ranking algorithms are based on a quality-of-service of each of the one or more devices included in the network, a matching value between each of the active service instances and the requested type of service, or both.

* * * * *